UNITED STATES PATENT OFFICE.

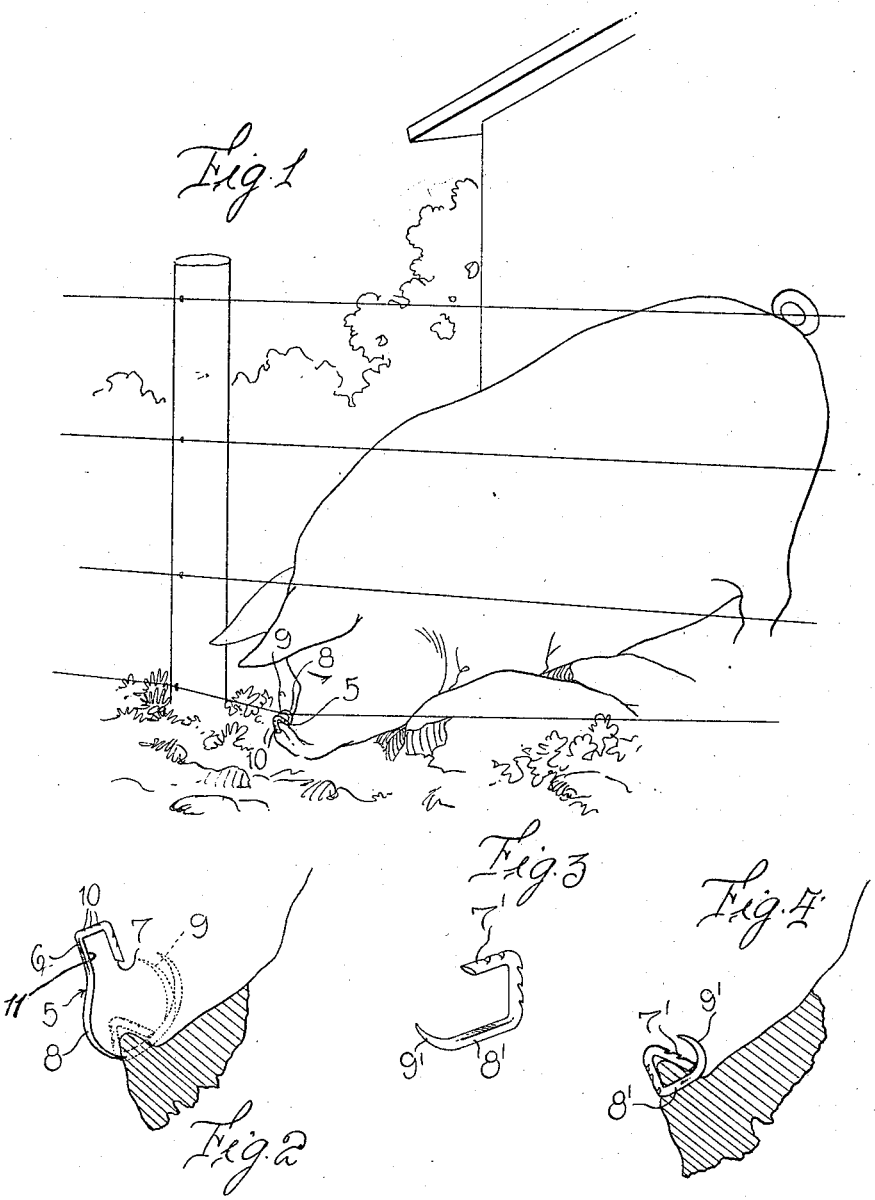

CHARLES T. HANCOCK, OF GALENA, MISSOURI.

ANIMAL NOSE-RING.

1,276,352.

Specification of Letters Patent.

Patented Aug. 20, 1918.

Application filed March 25, 1918. Serial No. 224,582.

*To all whom it may concern:*

Be it known that I, CHARLES T. HANCOCK, a citizen of the United States, residing at Galena, in the county of Stone and State of Missouri, have invented certain new and useful Improvements in Animal Nose-Rings, of which the following is a specification, reference being had to the accompanying drawings.

This invention relates to animal nose rings, and more particularly to a hog ring, the invention having for its primary object to provide a device which can be easily and quickly applied to the snout of the hog without necessitating the use of an especially constructed tool or instrument.

It is another object of my invention to provide a hog ring which will effectively prevent the animal from rooting or working its head beneath a wire fence.

And it is a further general object of the invention to provide a hog ring which is exceedingly simple in its construction and can be expeditiously manufactured in large quantities and sold at comparatively small cost.

With the above and other objects in view the invention consists in the improved construction of the several parts of the device as will be hereinafter more fully described, subsequently claimed and illustrated in the accompanying drawing in which similar reference characters designate corresponding parts throughout the several views and wherein;

Figure 1 is a perspective views of one embodiment of my improved hog ring showing the same applied to the animal's snout;

Fig. 2 is an enlarged elevation of the device in its original form and showing the manner of applying the same;

Fig. 3 is a perspective view of a slightly modified form of the device; and

Fig. 4 is a side elevation showing the latter form of the ring applied to the snout of the hog.

Referring in detail to the drawing, 5 generally designates my improved hog ring which is formed from a single length of wire of requisite diameter, said wire in its original condition and before application to the snout of the hog being bent at one of it ends into substantially U-shaped form, as indicated at 6. The longitudinally extending terminal portion of this bent end of the wire has its end face mitered or obliquely inclined on an angle of substantially 45°, as shown at 7. The other end portion of the wire extends beyond said terminal arm and is bent or curved as at 8, said bent end of the wire defining a gradual hook having a sharpened or pointed terminal, as shown at 9.

In the use of the device, as shown in Figs. 1 and 2, the sharpened or pointed hook 8 is forced in a rearward direction through the upwardly extending muscular tip of the animal's snout until said portion of the snout is disposed within the U-shaped end of the ring. With an ordinary pair of pliers, or other convenient means, the terminal arm of the U-shaped end 6 of the wire, is then bent inwardly until the inclined face is in contact with the body of the wire, thereby closing the U-shaped end of the device. The pointed end 9 of the wire can then be bent over into a more pronounced hook, as shown in Fig. 1 so that it will properly engage a fence wire and prevent the hog from thrusting its head beneath the wire. Preferably, the outer sides of the terminal arm and the medial portion of the U-shaped end of the wire are provided with spaced notches indicated at 10 for a like purpose.

The longitudinal arm of the U-shaped portion 6 of the device from which the hook 8 extends, is flattened or of rectangular form, shown at 11, so that the inclined end face 7 of the terminal arm will not be liable to slip off of the opposed arm, when the ring is closed in the manner above described. This rectangular formation of the wire section affords a close fitting joint and obviates the possibility of the ring catching in fibers or roots and being torn from the nose of the animal.

It will be readily understood that with my improved nose ring applied as shown in Fig. 1, the hog cannot root into the ground, as the ring will first contact with the ground and cause such discomfort to the animal that it will desist in its efforts.

In Figs. 3 and 4 of the drawing I have illustrated a slightly modified form of the invention wherein the extended curved end portion 8 above referred to is dispensed with, and the device is formed from a relatively short length of wire bent into U-shaped form to provide the arm 7' and the opposed parallel arm 8' which is of but slightly greater length that the arm 7' and has a laterally curved pointed terminal 9' which extends over the end of the arm 7' when the latter arm has been bent inwardly and closed against the arm 8' by means of the pliers or pincers as above explained. This modified form of the device also operates in an effective and reliable manner to prevent the hog from working its head under a wire fence or from rooting into the ground. Either form of my invention, may obviously be produced at very small manufacturing cost.

From the foregoing description taken in connection with the accompanying drawing, the construction, manner of use and several advantages of the device will be clearly and fully understood. My improved nose ring can of course be made in various sizes, and as it consists of a single wire rod, it will be apparent that the device is exceedingly strong and durable, and when once properly applied to the snout of the animal, cannot be broken off or otherwise released from its applied position. I have herein illustrated and described two forms of the nose ring which I have found to be very serviceable in practical use, but it is to be understood that the device is also susceptible of many other modifications in the several features thereof, and I accordingly reserve the privilege of adopting all such legitimate changes as may be fairly embodied within the spirit and scope of the invention as claimed.

Having thus fully described my invention, what I claim is:—

1. As an improved article of manufacture, a nose ring for animals consisting of a wire rod having a U-shaped end portion provided with parallel arms of relatively different lengths, the longer arm having a longitudinally curved portion extending beyond the shorter arm for insertion through the nose of the animal, said short arm being adapted to be subsequently bent inwardly and engaged at its extremity against the longer arm to close the U-shaped end of the ring.

2. As an improved article of manufacture, a nose ring for animals formed from a single wire rod, one end of said rod being bent into U-shaped form and the other end thereof being sharpened to penetrate the animal's nose, one arm of said U-shaped portion of the rod having an inclined end face and the opposed arm being of rectangular form to present a plane surface, said first named arm adapted to be bent inwardly to closely engage the inclined end face thereof with the surface of said second named arm.

In testimony whereof I hereunto affix my signature in the presence of two witnesses.

CHARLES T. HANCOCK.

Witnesses:
BERT GARDNER,
R. P. McGARRIN.

Copies of this patent may be obtained for five cents each, by addressing the "Commissioner of Patents, Washington, D. C."